Oct. 24, 1950　　　L. N. VERNON ET AL　　　2,527,469
PSYCHOLOGICAL TEST SCORING DEVICE
Filed Nov. 8, 1946　　　　　　　　　　　　　　7 Sheets-Sheet 1
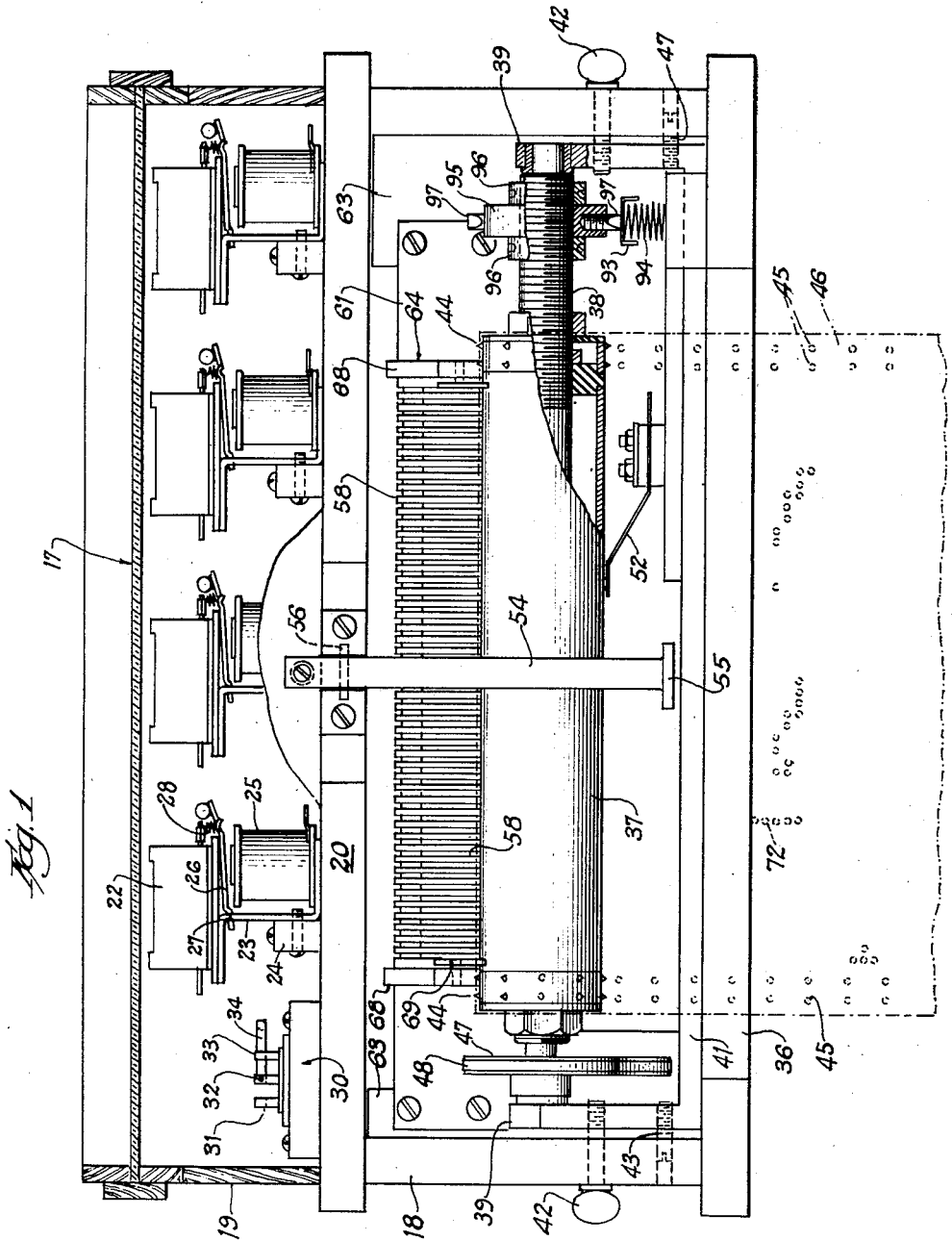
INVENTORS
Leroy N. Vernon
Charles A. Olson
BY
Sheridan, Davis & Cargill
Attys.

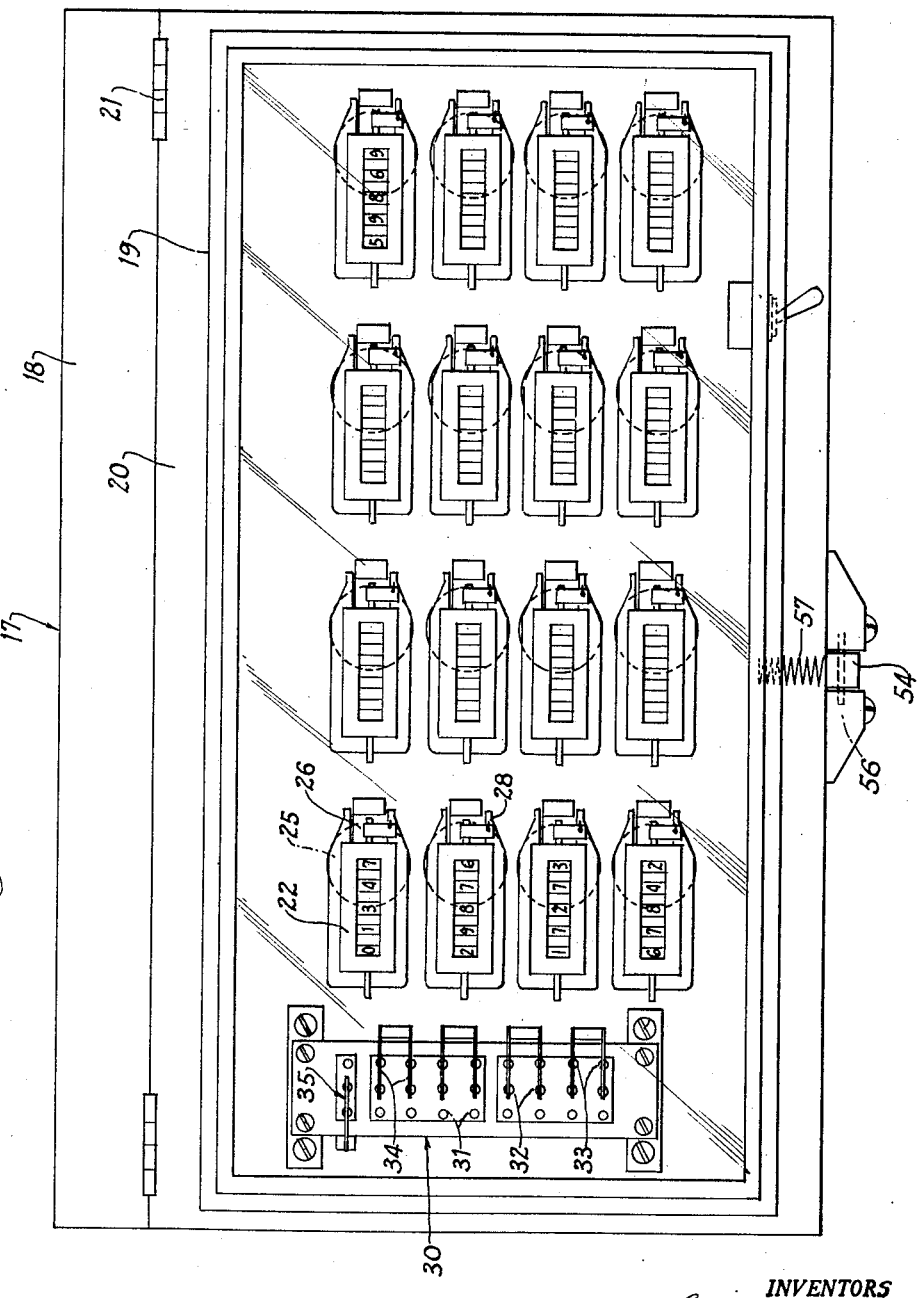

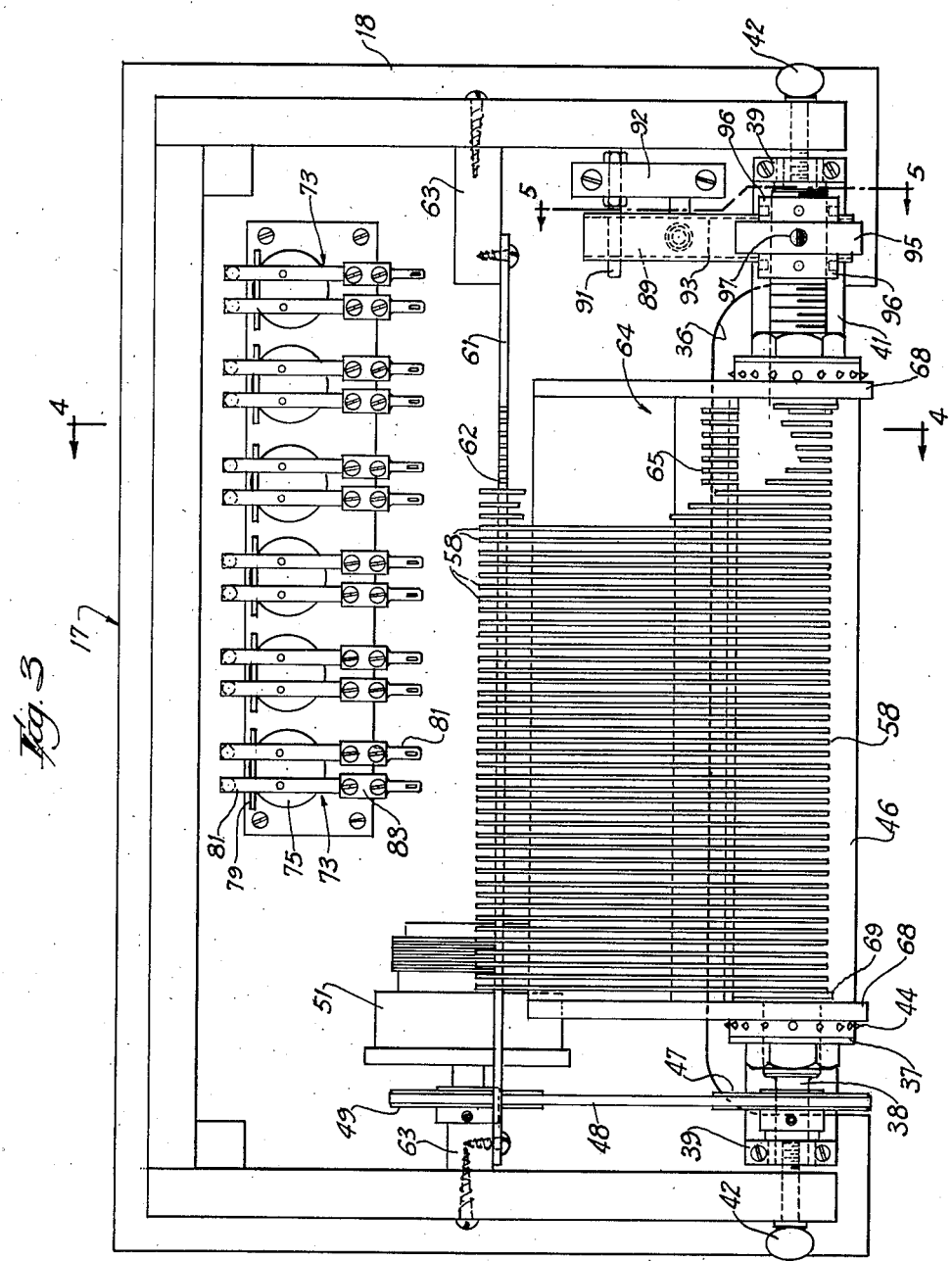

Oct. 24, 1950     L. N. VERNON ET AL     2,527,469
PSYCHOLOGICAL TEST SCORING DEVICE
Filed Nov. 8, 1946                          7 Sheets-Sheet 4
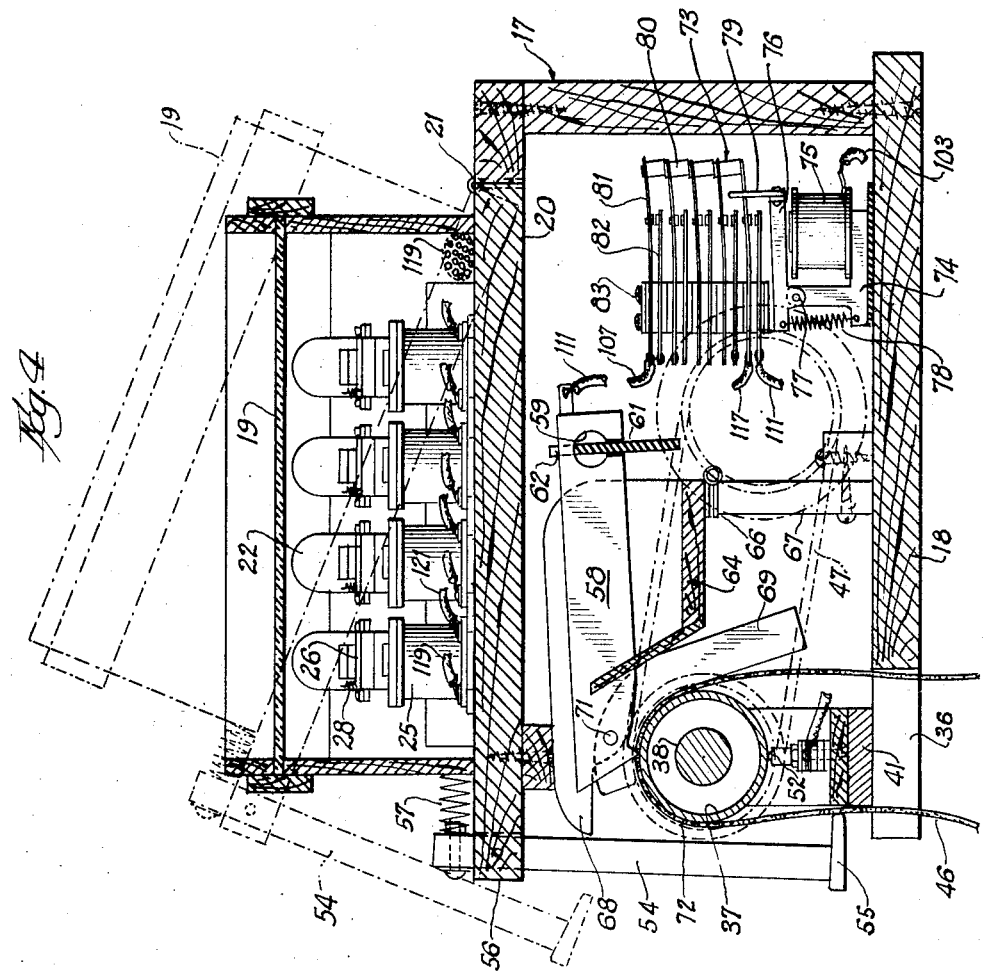
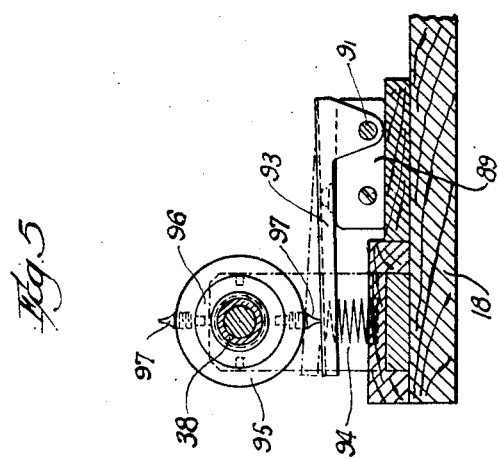
INVENTORS
Leroy N. Vernon
Charles A. Olson
BY
Sheridan, Davis & Cargill
Attys.

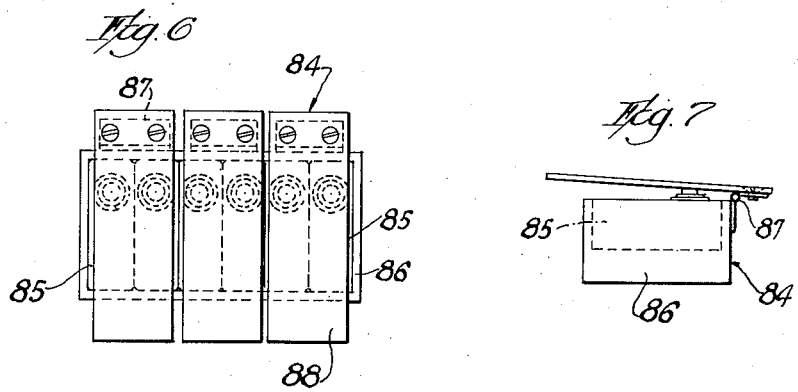
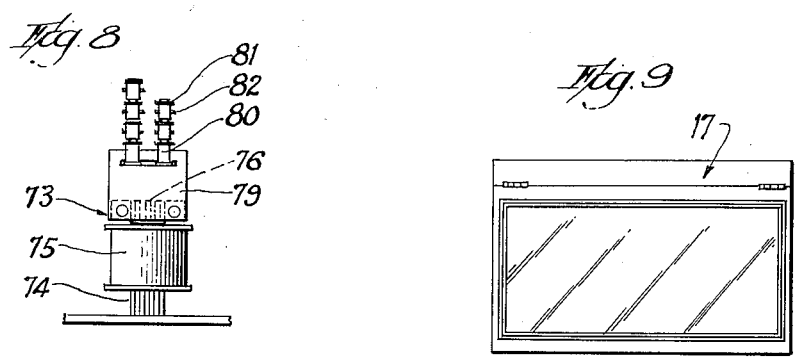
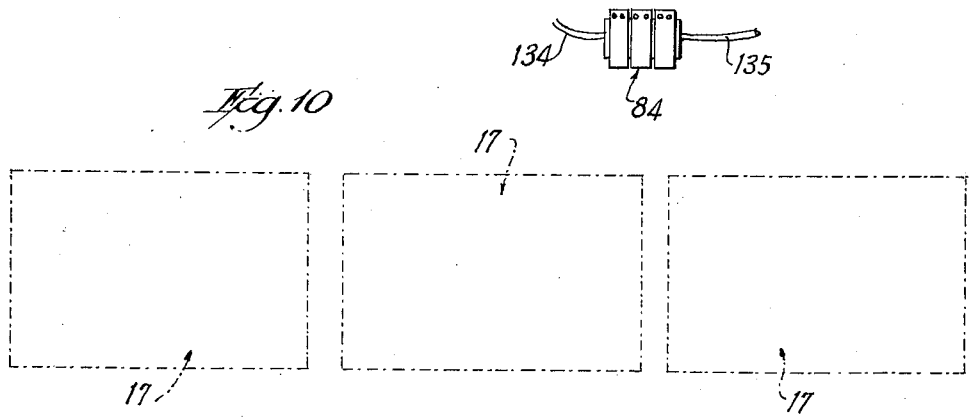

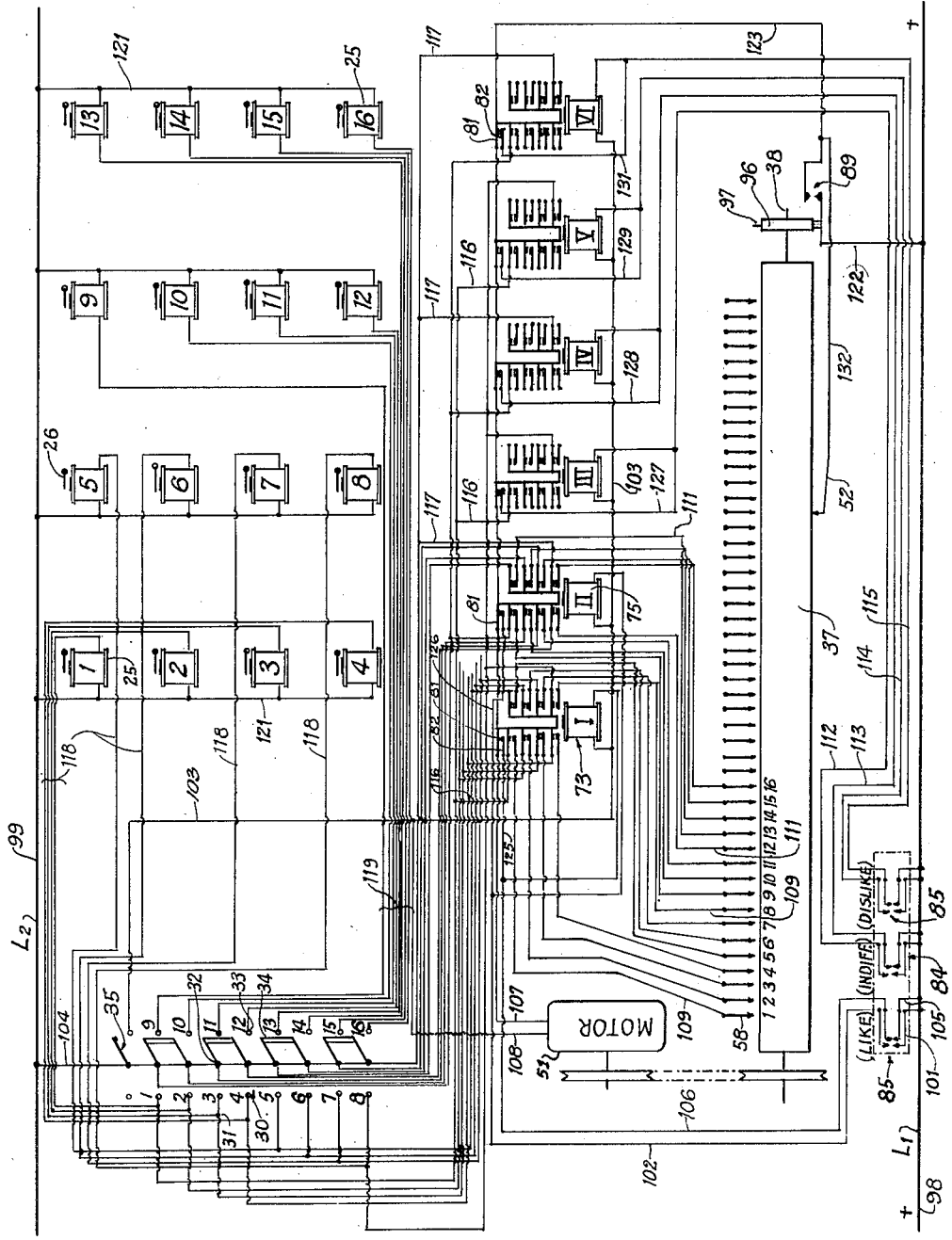

Oct. 24, 1950   L. N. VERNON ET AL   2,527,469
PSYCHOLOGICAL TEST SCORING DEVICE
Filed Nov. 8, 1946   7 Sheets-Sheet 7
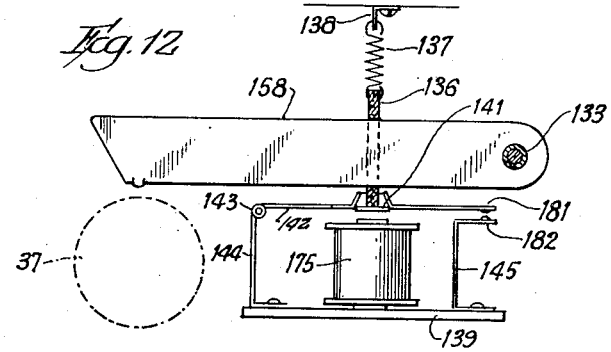
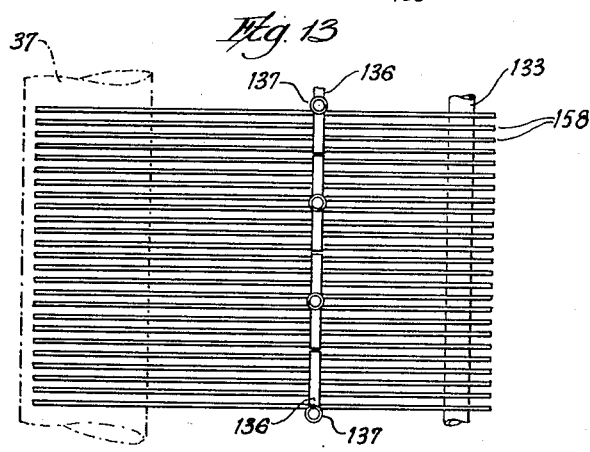
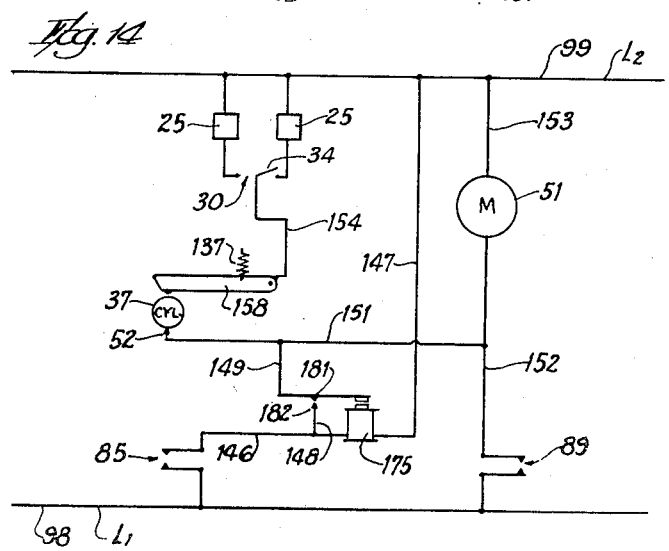
INVENTORS
Leroy N. Vernon
Charles A. Olson
BY
Sheridan, Davis & Cargill
Attys.

Patented Oct. 24, 1950

2,527,469

UNITED STATES PATENT OFFICE 2,527,469

PSYCHOLOGICAL TEST SCORING DEVICE

Leroy N. Vernon and Charles A. Olson,
Geneva, Ill.

Application November 8, 1946, Serial No. 708,576

8 Claims. (Cl. 35—22)

This invention relates in general to computing machines and more particularly to psychological test scoring devices.

The psychological tests of interest herein are employed for the purpose of ascertaining for what vocations or lines of endeavor the individuals tested are best suited, that is, to determine the psychological variables, comprising the aptitudes, interests or personality traits of an individual for various pursuits or occupations. Such tests comprise a plurality of multiple choice questions, each of which is so framed as to indicate, by the choice of answer made thereto, the psychological variables of the person taking the test. Any selected answer to a particular question will influence the determination or score of each of the several aptitudes, interests or personality traits for which the test is designed in different degrees. Consequently, numerical values are assigned the available answers to each of the questions corresponding to the relative effect each answer has in relation to each of the several psychological variables covered by the test. In order to determine the scores made by an individual on a given test, these numerical values assigned the selected answers and relating in each instance to each of the several variables covered by the test are totaled for each of such variables.

For example, a given test may comprise twenty questions, for each of which a desired one of three possible answers may be selected. In this particular test we will presume that it is desired to ascertain the degree of aptitude of anyone taking the test in sixteen different skills or pursuits, i. e., that it is desired to obtain a score for each of sixteen different aptitudes. Numerical values are therefore assigned to each of these sixty possible answers for each of the sixteen aptitudes in accordance with the effect on each aptitude that it has been found that the selection of each answer would have. Each answer consequently is the basis for several part scores, and the selection of such answer by one taking the test in accordance with his or her likes or dislikes comprises an automatic selection of predetermined quantities to be added to sixteen separate totals or scores, one for each aptitude or skill. After this test has been taken, it is therefore necessary to add up the part scores for each of the sixteen aptitudes to obtain the total scores which will indicate for which of such skills or pursuits the person taking the test is best suited.

A principal object of the present invention is the provision of a machine for accurately and rapidly scoring such a psychological test.

Another important object of the invention is to provide such a machine which will simultaneously derive totals for a number of variables from a given set of answers by selecting the proper quantities to be added as part scores for each answer, and accumulating the same as a number of total scores, one for each desired variable.

A further object of the invention is the provision of a machine operable in response to selective actuation of one of several control members to accumulate predetermined quantities as a plurality of totals, such quantities being variable by the selection of different ones of said control members.

Another object of the invention is the provision in such a machine of determining means selectively rendered effective by actuation of such control members to determine the values of the quantities or part scores to be accumulated for each desired total.

A further object is the provision in such a machine of a plurality of totalizers, one for each variable, and a switching assembly selectively operable to render said totalizers or desired ones thereof operative or inoperative.

Another object of the invention is to provide such a machine which may be employed to score any desired psychological test merely by use of a particular determining means corresponding thereto, a different such determining means being provided for each different test to be scored.

Still another object of the invention is the provision of such a machine which may be operated in duplicate or multiple, i. e. in bank, under the control of only one set of such selectively operable control members to provide scores for any desired number of variables in excess of those obtainable with one such machine and simultaneously from the one set of answers given on any desired psychological test.

Numerous other objects and advantages of the invention will be apparent as it is better understood from the following description, which, when taken in connection with the accompanying drawings, discloses a preferred embodiment thereof.

In the drawings:

Fig. 1 is a front elevational view of a device illustrating the instant invention, with a forward wall of the upper part of the casing broken away;

Fig. 2 is a top plan view of the machine of Fig. 1;

Fig. 3 is a top plan view of the mechanism contained in the lower part of the casing;

Fig. 4 is a vertical sectional view taken substantially on the line 4—4 of Fig. 3;

Fig. 5 is a detail vertical section taken substantially on the line 5—5 of Fig. 3;

Fig. 6 is a top plan view of a preferred control unit which is normally disposed exteriorly of the casing of the machine illustrated in the previous figures;

Fig. 7 is a side elevational view of the manually operable control unit of Fig. 6;

Fig. 8 is a detail rear elevational view of one of the control relays shown in side elevation in Fig. 4;

Fig. 9 is a plan view of the scoring device illustrating the exterior positioning of the control unit of Figs. 6 and 7 relative to the main casing;

Fig. 10 is a diagrammatic view illustrating the combination or series arrangement of a plurality of scoring devices arranged for operation responsive to a single control unit;

Fig. 11 is a wiring diagram of the scoring device illustrated in Figs. 1 to 5;

Fig. 12 is a vertical sectional view of a modified form of the invention;

Fig. 13 is a plan view of the mechanism shown in Fig. 12; and

Fig. 14 is a wiring diagram of one of the control units of the modification of Figs. 12 and 13.

Referring more particularly to the drawings, reference numeral 17 indicates in general a psychological test scoring device embodying the features of the present invention which may be housed within a two-part casing 18, 19. As is best illustrated in Figs. 1 and 4, the forward wall of the lower part 19 of the casing is open, and the top wall 20 thereof, which also forms the lower wall of the upper part 18 of the casing, is hinged at 21 adjacent its rear end so that the upper part 18 may be moved upwardly and rearwardly as illustrated in broken lines in Fig. 4 to facilitate access to the major portion of the mechanism which is enclosed within the lower part 19.

A plurality of registers or counters 22, illustrated in Fig. 2 as 16 in number, are mounted on suitable individual brackets 23 within the upper part of the casing 18. Each of the brackets 23 is removably secured to the casing wall 20 by any suitable retaining means 24, and the lower portion of each of these brackets is also adapted to receive and retain a vertically disposed solenoid 25. The armature of each solenoid 25, when energized, is adapted to move an actuating arm 26 (Fig. 1) downwardly about its pivot 27 and against the action of a spring 28. Upon de-energization of the solenoid 25, the spring 28 functions to return the actuating arm 26 to its normal position of Fig. 1. Each such complete movement of an actuating arm 26 by its associated solenoid 25 and spring 28 functions to impart a single actuation of unitary value to the associated register 22. The registers 22 are constructed in a manner well-known to the art and contain suitable tens transfer mechanism to enable them to accumulate digital values imparted thereto by repeated actuations of the arm 26. The several solenoids 25 thus comprise electrically controlled means for selectively and individually actuating the several counters or registers 22.

In the initial general description of the instant invention, an example was assumed in which it was desired to obtain individual scores for sixteen different skills or aptitudes. The present embodiment of the invention has therefore been illustrated as including sixteen registers 22, each of which is adapted to accumulate part scores for a particular aptitude. It will, of course be readily understood that this number of sixteen aptitudes is purely arbitrary, and that it has been selected as being the maximum number of aptitudes which it is normally desired to score from any of the standard psychological tests employed. However, since it is frequently desired to obtain scores from test answers for a lesser number of aptitudes, means have been provided in the embodiment herein illustrated for selecting for actuation less than the total number of registers 22 incorporated in the device. This means comprises a switching assembly 30 best illustrated in Figs. 1 and 2. This switching assembly comprises three parallel rows 31, 32, and 33 of individual terminal posts extending from front to rear of the machine and mounted in any suitable manner on the casing wall 20. Each of these rows includes eight separate terminals. Four pairs of knife switch blades 34 are pivotally secured respectively at their lower ends to adjacent terminals of the middle row 32, and may be swung selectively either to their position of Fig. 2 in which they connect the individual terminals of the central row 32 with associated terminals of the inner row 33, or to an outer position in which the terminals 31 of the outer row are individually connected to their associated terminals of the central row. As will be described more fully hereinafter, the terminals of the outer row 31 are connected respectively to the leftmost eight solenoids 25, and the terminals of the inner row 33 are connected respectively to the remaining eight solenoids 25 disposed at the right hand side of the casing. These connections will be described in detail when considering the wiring diagram of Fig. 11, at which time the manner in which a master switch 35 (illustrated in Fig. 2 as also being mounted to form a part of the switching assembly 30) is connected in the electrical sytem of the device will also be described in detail.

As previously referred to and best illustrated in Figs. 1, 3 and 4, the front wall of the lower part 18 of the casing is open. Adjacent this open portion of the casing, the bottom of the lower part 18 of the casing is provided with a cut-away portion 36. Directly above this cut-away portion 36, is disposed a hollow metal cylinder 37 adjustably mounted upon and insulated from a shaft 38 rotatably mounted in trunnions or bearing brackets 39. Each of the brackets 39 is secured by any suitable means to an upper end of a U-shaped supporting frame 41 which rests upon the bottom of lower part 18 of the casing, extends across the cutout portion 36 and terminates short of the side walls of the lower part 18 of the casing. The upwardly extending, bearing bracket supporting ends of the frame 41 are adjustable relative to the associated side walls of the lower part 18 of the casing by thumb screws 42 (Figs. 1 and 3). Below each of the thumb screws 42, the roller or cylinder supporting frame 41 is secured to the adjacent side walls of the lower part 18 of the casing by suitable screws 43. With this arrangement, it will be seen that the frame 41, and consequently the hollow cylinder or roller 37 supported thereby, may be adjusted laterally relative to the casing, while being rigidly secured to the casing in any desired adjusted position. Adjacent each of its ends, the cylinder 37 is provided on the outer periphery thereof with a plurality of circumferentially spaced protuberances 44 which comprise a driving sprocket cooperating with marginal rows of spaced apertures 45 in a perforated sheet 46. The sheet 46 comprises what will hereinafter be referred to as the determining means and is preferably formed as a long strip of heavy paper, although any other suitable material may be employed.

The shaft 38 of the cylinder 37 is provided adjacent its left end, as viewed in Fig. 1, with a pulley wheel 47 rigidly secured thereto which is adapted to be driven by a belt or chain 48 from a similar pulley 49 connected in any suitable manner to the shaft of a motor 51 (Fig. 3). The motor 51 is mounted interiorly of the lower part 18 of the casing, and is connected to a suitable source of electrical energy in a manner to be described in detail hereinafter. As best seen in Fig. 1, a spring contact 52 mounted by means of an insulation block 53 on the cylinder supporting frame 41 has its free end resiliently engaging the outer surface of the hollow cylinder 37. The spring contact 52 is electrically connected to one side of the line or source of energy employed in a manner to be described in detail in connection with the wiring diagram of Fig. 11.

The sheet 46, when in its operative position of the drawings, is in engagement with the upper surface of the cylinder 37 and extends downwardly through the cut-away portion 36 of the bottom of the casing on each side of the transversely disposed supporting bracket 41 (Fig. 4). The determing means or sheet 46 thus does not interfere with the engagement of the spring contact 52 with the cylinder 37. In order to insure driving contact being maintained between the sprocket portion 44 of the cylinder and the apertures 45 of the sheet 46, a spring urged lever 54 (best shown in Fig. 4) is provided at its lower end with a sheet engaging finger 55 and is pivoted adjacent its upper end at 56 to the intermediate wall 20 of the casing. A spring 57 is interposed between the upper end of the lever 54 and the front wall of the upper part 19 of the casing.

Means are provided for sensing the determining means 46 and receiving electrical impulses from the cylinder 37 under the control of the determining means or sheet 46. This sensing means comprises a plurality of laterally spaced contact members 58 extending in parallel relationship to each other from front to rear of the machine. Adjacent their rear ends, each of the contacts 58 is provided with a key-hole shaped aperture 59 resting upon and loosely engaging the upper end portion of a transverse supporting frame or comb 61 having suitable slots 62 in its upper edge (Fig. 3) for retaining the rear ends of the contacts in proper spaced relationship. The comb 61 is formed of any desired insulating material and is secured at its outer ends by suitable screws (Fig. 3) to blocks 63 pivotally mounted in any suitable manner on the end walls of the lower part 18 of the casing for frictional engagement therewith. A second comb 64 extends transversely of the machine substantially parallel to and forwardly of the contact supporting comb 61 which is provided with slots 65 (Fig. 3) in the upper edge of the transverse portion thereof for engaging and maintaining proper spacing between the contacts 58. At its rear end, the comb 64 is pivotally secured by means of a hinge 66 (Fig. 4) to a supporting block 67 mounted in any desired manner within the casing. The side or end portions of the comb 64 are formed as a pair of forwardly extending fingers 68 adapted to be engaged by the machine operator and lifted to swing the comb 64 upwardly about its pivot 66 to raise all of the contacts 58 as a unit out of engagement with the sheet 46 and cylinder 37. This movement of the contacts 58 permits insertion and removal of the sheet 46.

In the normal operative position of this sensing mechanism, however, the forward ends of the several contacts 58 are in engagement with either the sheet 46 or the cylinder 37 and do not rest upon the lifting comb 64. The end contacts 58 are each provided with a cylinder engaging member 69 pivotally secured near its upper end at 71 (Fig. 4). The members 69 thus function to retain the sheet 46 in proper driving engagement with the sprocket portion 44 of the cylinder. It will be understood that the slots 65 in the comb 64 are sufficiently deep to prevent engagement thereby with the lower edge of the contacts 58 when the parts are in this normal or operative position. At the same time, by virtue of the pivotal mounting of the comb 61 which supports the rear ends of the contacts 58, the sensing means comprising the contacts 58 and their supporting members may be swung upwardly and rearwardly to provide complete clearance from the cylinder 37, if the upper part 19 of the casing is first raised about its pivot 21. It will also be understood that the combs 61 and 64 may be rigidly joined or formed integrally with each other, if desired, and together mounted to pivot on the supporting block 67 by the hinge 66.

A different determining means or sheet 46 will be employed in scoring each different type of test. For each given psychological test, the sheet 46 employed is provided with vertical, laterally spaced sections corresponding in number to the possible answers which may be selected for each question comprising the test. For example, with the previously assumed test there are three possible answers which may be selected for each question comprising the test. Consequently, the sheet 46 employed as a determining means in scoring all answers to this test will be divided into three laterally disposed sections. Within each of these sections, the sheet 46 is divided lengthwise into a number of portions corresponding to the total number of questions included in this particular test. Each of these portions of the sheet 46 extends lengthwise of the sheet (vertically in Figs. 1 and 4) a distance equal to ½ of the circumference of the cylinder 37. It will be understood that this vertical distance or depth of each portion of the sheet 46 corresponding to each answer of the test will be uniform throughout the length of the sheet but may be varied in accordance with the particular manner of controlling the length of the cycle of operation of the cylinder 37, which will be more fully described hereinafter. Within each of these portions and sections of the sheet 46, a variable series of apertures 72 are provided in the sheet (Fig. 1) in laterally spaced rows. The number of these rows in each section of the sheet corresponds to the number of variables for which it is desired to obtain scores from the answers given to the questions of the test. Consequently, with the presently assumed test, each of the three laterally disposed sections of the determining sheet 46 will be divided into sixteen laterally disposed rows spaced similarly to and corresponding with the sixteen contacts 58 provided for each of these sections. A number of apertures 72 is provided in each of these rows corresponding to the weight or count to be given to the answer represented by that section in relation to its effect upon a particular variable represented by that row. Weighted quantities having been selected as proper part scores for each variable in accordance with each possible selected answer to each question of the test, such quantities are translated to the determining means of the machine by punching a number of apertures 72 in the sheet 46 in the proper row of the proper section in that portion of the sheet representing the possible answers to a particular question. For example, these weighted quantities may be arbitrarily selected as anything from zero to eight, and depending upon the effect on a particular variable that it is thought that the selection of a particular answer to a given question would have, a number comprising a proper score will be selected having a value of from zero to eight which will be incorporated in the determining means by the punching of a corresponding number of apertures 72 in the row representing the particular variable being considered, and in the section representing the question being considered. It will be understood, therefore, that the sheet 46 to be used in scoring each test most likely will be prepared by the person devising or giving the test, but that it will comprise a functional part of the scoring device in scoring all such tests.

Each sheet 46, for convenience in mounting upon the cylinder 37, will be provided with a blank marginal portion at its leading edge. That is, the end of the sheet which is first mounted upon the cylinder 37 beneath the forward ends of the contacts 58 is blank. The remainder of the sheet is divided lengthwise into the portions above referred to of equal depth and corresponding successively to the numbered questions comprising the test. Consequently, since the assumed test has been described as including twenty questions, the sheet 46 employed as the determining means in scoring such test will include twenty such portions spaced lengthwise thereof and corresponding successively to the twenty questions of the test. After the leading portion of the sheet has been engaged with the sprocket portions 44 of the cylinder 37 and the sensing or control means comprising the contacts 58 have been placed in operative position, rotation of the cylinder 37 will cause successive engagements of the lower forward ends of the contacts 58 with the cylinder 37 in accordance with the numbers of apertures 72 thus provided in the sheet in alignment with each of the contacts. Each time that a contact 58 engages the cylinder 37 through an aperture 72 a circuit will be completed through that contact, providing the remaining portion of such circuit to be described hereinafter is closed, to an associated one of the solenoids 25 to cause a unitary actuation of its register 22.

Control means are provided for selecting and rendering operative one of the sections of the determining means 46 in accordance with the particular answer which has been given to each of the questions comprising the test being scored. This control means selects and renders operative the contacts 58 associated with the desired section of the determining means 46. In the assumed test, there being three sections on the sheet 46, there are sixteen contacts 58 associated with each such section corresponding to the three possible answers for each question of the test. This control means comprises a plurality of relays 73, illustrated in Figs. 3, 4 and 11 as six in number in the present embodiment of the scoring device. Referring particularly to Figs. 3, 4 and 8, each of these relays 73 includes a supporting frame 74, mounted upon and insulated from the bottom wall of the lower part 18 of the casing, upon which is mounted a solenoid 75 having a vertically disposed core. An armature 76 extending horizontally adjacent the upper end of the core of each solenoid 75 is pivotally connected to the frame 74 at 77 and is provided at its forward end with a spring 78 normally holding the armature in its upper inoperative position of Fig. 4 out of contact with the core of the solenoid. At its rear end, the armature 76 has a vertically disposed contact actuating frame 79 connected thereto. As best illustrated in Fig. 8, the frame 79, which is preferably composed of any suitable insulating material, is provided with a horizontally disposed slot which engages the two lowermost pairs of a plurality of pairs of spring contacts 81, 82. There are two vertically arranged rows of such pairs of spring contacts, one including four and the other five such pairs. Adjacent their rear ends (Figs. 4 and 8), each of these pairs of spring contacts 81, 82, except the two lowermost, are normally maintained open by insulating spacers 80 extending through and connected to each top contact 81 for cooperation with the next lower contact 81. Adjacent their forward ends, these pairs of spring contacts 81, 82 are mounted in tiers of blocks of insulating material 83 secured in any suitable manner to the relay supporting frame 74. One of each of these pairs of spring contacts 81, 82 is electrically connected, in a manner to be later described in detail in reference to the wiring diagram of Fig. 11, to one of the sensing contacts 58, except for the topmost pair in the vertical row containing the five pairs of contacts. For each of the relays 73 this extra top or ninth pair of spring contacts 81, 82 is electrically connected in series with the motor 51 for a purpose also to be described hereinafter. Each of the relays 73 thus comprises a control means for selectively rendering effective eight of the sensing contacts 58, energization of the solenoid 75 functioning to draw its armature 76 downwardly against the action of the spring 78 to lower the frame 79 to close all of the spring contacts 81, 82 associated therewith. From Fig. 3, it will be seen that there are six of these relays 73. Since each of these relays is provided with eight pairs of spring contacts 81, 82 for closing a circuit, respectively, through one of the contacts 58, energization of each solenoid 75 will render effective eight of the forty-eight contacts 58.

Manually operable control members are provided for selectively causing the actuation of the relays 73. These members in the preferred embodiment of the machine comprise a control unit indicated generally by reference number 84 (Figs. 6, 9, 10 and 11), which is preferably disposed exteriorly of the casing of the machine for convenient operation by the person scoring the psychological test. As best illustrated in Fig. 6, this unit 84 comprises six micro-switches 85 of well-known construction mounted within a suitable casing 86. Hingedly connected to the rear wall of the casing 86 at 87 (Fig. 7) are three forwardly extending, manually operable finger pieces or control members 88. As shown in Fig. 6, each of the control members 88 overlies the plunger of two of the micro-switches 85. Each of the switches 85 is electrically connected in series in a manner to be described hereinafter with one of the solenoids 75 of the six relays 73. Consequently, downward pressure applied manually to any one of the control members 88 will cause two of the relays 73 to be energized to render effective the sixteen sensing contacts 58 associated with one of the three sections of the determining means 46. In other words, as a psychological test is being scored, the operator actuates that one of the control members 88 corresponding to the answer selected from the possible answers by the person taking the test. Such selective actuation of the control members 88 is repeated successively for the total number of questions comprising the test. In the embodiment illustrated in Figs. 6 and 7, the control members 88 may be swung rearwardly out of operative association with the micro-switches 85 so that these switches may be selectively actuated individually by the operator of the machine in the event it is desired to operate the scoring device in a manner different from that employed in scoring the assumed test, i. e., whenever a particular test to be scored contains a different number of possible answers to each question, such as six for example. This optional manner of using the instant device for scoring psychological tests different from that previously assumed herein will be discussed in greater detail hereinafter. As will also be described in detail later, actuation of any of the micro-switches 85 or control members 88 will result in energization of the motor 51 to rotate the cylinder 37 because of the resulting closing of the extra or topmost pair of spring contacts 81, 82 associated with the actuated relay 73, each such extra pair of contacts 81, 82 being connected in series with the motor 51.

In normal operation of the instant device, the operator cannot be expected to retain a control member 88 in depressed position for the exact length of time necessary to complete one cycle of operation. Consequently, means are provided for insuring the completion of one cycle of operation of the machine following the initiation of such cycle of operation by depression of any selected control member 88 or switch 85, even though the actuation of the control member or switch 85 be only instantaneous. As best illustrated in Fig. 5 and also shown in Figs. 1, 3 and 11, a micro-switch 89 mounted in any suitable manner on the bottom of the lower part 18 of the casing 19 is connected in series with the upper contacts 81 of all of the extra, topmost pairs of contacts 81, 82 of the several relays 73 in a manner to be described in detail hereinafter. Pivotally mounted at 91, as by means of a bracket 92 (Fig. 3) supporting said pivot in any desired manner, is the rear end of a switch actuating lever 93 normally urged upwardly by a coil spring 94 into engagement with the under surface of a collar 95 mounted upon and adjustably secured to the shaft 38 by a pair of nuts or threaded retaining members 96.

In the normal position of rest of the several parts of the machine, the cylinder 37, shaft 38 and the collar 95 will be either in the position of Fig. 5 or in a position wherein they have been rotated 180° therefrom. In either of these normal positions of rest, one or the other of a pair of stud bolts 97 threadedly engaged in suitable tapped apertures in the collar 95 in diametrically opposed relationship will engage the forward end of the lever 93 to retain the same in its full line position of Fig. 5, in which position the lever 93 holds the switch 89 open. Rotation of the shaft 38 and collar 95 in response to operation of the motor 51 initiated by closing of any of the control switches 85 will remove the operative one of the bolts 97 from engagement with the lever 93 to permit the spring 94 to move the lever to its broken line position of Fig. 5 to enable automatic closing of the micro-switch 89. Since this actuation of a selected control member 88 has caused energization of one or more of the relays 73, the spring contacts 81, 82 of such relay or relays have been closed, so that a circuit has been completed through the switch 89, the closed pair of associated contacts 81, 82 and the motor 51 to retain the latter in operation despite opening of the actuated switch 85 resulting from release of finger pressure from the control member 88. Consequently, the motor will continue to function after release of a selectively operated control member 88 and until one cycle of operation of the machine has been completed. As has been previously explained, a cycle of operation of the instant embodiment of the invention comprises one-half of a rotation, or rotation through 180°, of the shaft 38. Upon completion of such cycle of operation, the other of the bolts 97 in the collar 95 will be moved to the lower position of Fig. 5 to depress the lever 93 against the action of the spring 94 to open the switch 89. The flow of current to the motor 51 thus being terminated, a single cycle of operation of the machine will be completed despite only instantaneous operation of a control member 88.

As has been described hereinbefore, each such successive cycle of operation of the machine includes movement of a portion of the determining sheet 46 over the surface of the cylinder 37 and under the forward ends of the sensing contacts 58 equal in length, in the present embodiment, to one-half of the circumference of the cylinder 37. Each such portion of the determining sheet 46 employed corresponds successively to the questions comprising the test being scored and includes varying numbers of apertures 72 in alignment with each of the sensing contacts 58. However, only those sixteen contacts 58 associated with one of the three laterally disposed sections of each such portion of the sensing sheet 46 will have been rendered effective by their control relays 73 as determined by the selective actuation of the proper one of the control members 88 corresponding to the particular answer selected by the person taking the test being scored in answer to the particular question being scored.

In the assumed example of test which may be scored with the instant device, the three possible answers to each question are designated as "like," "indifferent" and "dislike." The three control members 88 of the unit 84 consequently correspond to these three possible answers and are so designated in Fig. 11. In the scoring of a test, if the answer to the first question has been given as "like," the operator actuates the leftmost control member 88. This will close the two switches 85 associated therewith and designated in Fig. 11 as "like." The closing of these two switches 85 will actuate the two leftmost relays 73, indicated in Fig. 11 at I and II, to energize the motor 51 and render effective the first sixteen contacts 58 at the left side of the machine. The resulting rotation of the cylinder 37 will move an associated portion of the determining sheet 46 past the forward ends of these sensing contacts, and each of the latter will be permitted to contact the cylinder 37 a varying number of times, as previously explained, resulting in successive closings of the circuit of which each said contact 58 is a part, to energize the solenoids 25 associated therewith a predetermined number of times. The part scores for each of the variables for which the test is being scored with thus be accumulated by their respective registers 22. Immediately upon the completion of a cycle of operation of the machine in response to the operation of the proper control member 88 corresponding to the answer given in the test being scored to the first question, the operator will selectively actuate one of the control members 88 in accordance with the answer given to the second question of the test. The machine is so operated through successive cycles a number of times corresponding to the number of questions included in the test being scored, and for each such cycle of operations corresponding to one of the questions, predetermined part scores will be accumulated in the several registers 22 corresponding to the number of variables being scored. Consequently, the total score for each variable will be indicated in the associated register 22 upon completion of a single such scoring of the test, and it is not necessary, as in the case of some prior art devices, to so score each test separately for each of the desired variables.

In Fig. 11 a wiring diagram is illustrated in which the circuits necessary to the accomplishment of the above described results are shown which now will be described in detail. The source of energy previously referred to is shown in Fig. 11 as comprising positive and negative lines 98 and 99, respectively, for direct current, or lines $L_1$ and $L_2$ for alternating current. Using the above assumed example in which the two switches 85 designated as "like" were closed, the circuits completed thereby are as follows: The outermost of these switches 85 in Fig. 11 is connected by a lead 101 to the positive lines 98 or the lead $L_1$. At the other side, this switch is connected by a lead 102 to one side of the relay 73 bearing numeral II. The other side of the solenoid 75 of this relay, as is the case of each of the other relays 73, is connected to a line 103 in turn connected to one side of the master switch 35. When closed, the master switch 35 connects this line 103 to the negative line 99 or the lead $L_2$ by means of a lead 104. The other associated switch 85 is similarly connected at one side by a lead 105 to the positive line 98, and at the other side by a lead 106 to one side of the solenoid 75 of the relay 73 bearing numeral I. Consequently, closing of these two switches 85 associated with the "like" control member 88 of the unit 84 will actuate the relays 73 bearing numerals I and II. All nine of the spring contacts 81, 82 associated with each of these relays will thereby be closed. The uppermost odd pair of contacts 81, 82 of each relay when thus closed causes energization of the motor 51. Each of the uppermost of these contacts 81 is connected in series as previously explained, and in turn, is connected to a lead 107 to one side of the motor 51. The other side of the motor is connected by a lead 108 to the line 103.

The lower contacts 82 of each of the other pairs of contacts 81, 82 of the relay 73 bearing numeral I are connected, respectively, by similar leads 109 to the first eight contacts 58 at the left of the machine. Similarly, the eight remaining lower contacts 82 of the relay 73 bearing numeral II are connected, respectively, by similar leads 111 to the next succeeding eight contacts 58, which are designated in Fig. 11 by numerals 9 to 16 inclusive. Although not completed in Fig. 11, it will be readily understood that the corresponding contacts 82 of the relay 73 bearing numeral III are similarly connected, respectively, to the next eight contacts 58, the corresponding contacts 82 of relay IV to the next succeeding eight contacts 58, the similar contacts 82 of relay V to the following eight contacts 58, and the similar contacts 82 of relay VI to the last eight contacts 58 at the right of the machine.

The third switch 85 from the left of the unit 84 is connected by a lead 112 to one side of the solenoid 75 of the relay III. The remaining three switches 85 of the unit 84 are connected respectively, by leads 113, 114 and 115 to the solenoids 75 of the relays IV, V and VI. As previously explained, the opposite sides of each of these solenoids are connected to the line 103 and through the master switch 35, to the negative line 99 or the lead $L_2$. Consequently, with the master switch 35 closed, closing of any of the switches 85 by their associated control members 88 will actuate the associated relays 73.

Referring again to relay 73 bearing numeral I, the upper contacts 81 of the eight pairs of contacts 81, 82 associated with the sensing contacts 58 are connected, respectively, by similar leads 116, comprising a cable, to the outer row of terminal posts 31 of the switching assembly 30, these posts being designated in Fig. 11 by numerals 1 to 8, inclusive. In similar manner, the upper contacts 81 of the relay 73 bearing numeral II associated with the sensing contacts 58 designated by numerals 9 to 16, inclusive, are connected, respectively, by similar leads 117, comprising another cable, to the central row of terminal posts 32 of the switching assembly which are designated, respectively, by numerals 9 to 16, inclusive. For the sake of simplicity, this wiring diagram includes similar connections from only two of the upper contacts 81 of each of the relays bearing numerals III and V to the cable 116, and of similar contacts 81 of the relays 73 bearing numerals IV and VI to the cable 117. It will thus be seen that the terminal posts 1 to 8 of the outer row 31 are connected, respectively, through the relays 73 bearing numerals I, III and V to the first, third and fifth groups of eight of the sensing contacts 58. Similarly, the terminal posts 9 to 16 of the central row 32 are each connected, respectively, through the relays 73 bearing numerals II, IV and VI to the second, fourth and sixth groups of eight sensing contacts 58, going from left to right of the machine.

The terminal posts 1 to 8 of the outer row 31 of the switching assembly 30 are also connected, respectively, by similar leads 118 to one side of the solenoids 25 which are similarly designated in Fig. 11 by numerals 1 to 8, inclusive. The terminal posts 9 to 16 of the innermost row 33 of the switching assembly 30 are likewise connected, respectively, by similar leads 119 to the one side of the register actuating solenoids 25 identified by numerals 9 to 16, inclusive. The opposite sides of each of these sixteen solenoids 25 are connected by similar leads 121 to the negative line 99 or lead $L_2$. If all of the knife switches 34 are thrown into engagement with the inner row of terminals 33, circuits will be closed from any of the similarly numbered sensing contacts 58 in each of the three groups of sixteen contacts to the respectively numbered register actuating solenoids 25, the group of sensing contacts which is activated depending upon which of the control members 88 has been actuated. For example, in the above assumed operation of the device in which the two "like" switches 85 were closed, circuits would be completed from each of the first sixteen sensing contacts 58 to the similarly numbered solenoids 25. Consequently, subsequent rotation of the cylinder 37 to move the determining sheet 46 past these sensing contacts will cause successive impulses to be transmitted through these circuits to their respective solenoids 25 in accordance with the apertures 72 provided in the sheet 46 in alignment with the different ones of these sensing contacts. Each such cyclic operation of the machine will therefore result in the accumulation of the proper predetermined part scores for each variable in the respective registers 22.

With the instant embodiment of the invention, optional connections may be made through the switching assembly 30 whenever it is desired to score tests for only eight variables, for example, and/or from two to six possible answers to each question of any particular test. As an example of this optional operation of the machine, all of the knife switches 34 may be swung over into engagement with the terminal posts of the outer row 31 of the switching assembly 30. Impulses then transmitted through the circuit leading from the first or leftmost sensing contact 58 will be directed through the relay 73 bearing numeral I to the register actuating solenoid 25 designated by numeral 1. Similarly, impulses picked up by the sensing contact 58 indicated at 9 in Fig. 11 will also be transferred to this same solenoid 25 designated by numeral 1, but through the relay 73 bearing numeral II. It will thus be seen that scores may be accumulated for eight different variables employing only the first or leftmost eight registers 22, in scoring any test in which from two to six optional answers are available for each question therein. With this arrangement, the control members 88 are thrown rearwardly out of operative relationship with the switches 85 and the machine operator selectively actuates the switches 85 directly in accordance with the answer given or selected for each question of the test being scored.

Regardless of the number of variables being scored and the number of optional answers available to each question, closing of any control switch 85 starts a single cycle of operation of the machine in the manner previously explained, and by means of switch 89, the motor 51 is continued in operation just long enough to insure completion of one cycle of operation, despite only instantaneous operation of a switch 85. As has been explained hereinbefore, the switch 89 is normally retained in open position by one or the other of the bolts 97 being in contact with the switch lever 93. Immediately upon initiation of the operation of the device by closing of a switch 85, this bolt 97 will be removed from contact with the lever 93 to permit the spring 94 to close the switch 89. As shown in Fig. 11, one side of the switch 89 is connected by a lead 122 to the positive line 98 or lead L1. The other side of the switch is connected by a lead 123 to each of the top spring contacts 81 of the odd or ninth pair of contacts 81, 82 of each of the six relays 73. The associated lower contact 82 of each of these pairs of contacts 81, 82 is in turn connected to the lead extending from the associated control switch 85 to the solenoid 75 of that relay. These leads from the several switches 85 are designated in Fig. 11, respectively, by reference numerals 106, 102, 112, 113, 114, and 115. The leads above mentioned which are connected, respectively, to these control leads from the respective contacts 82 of the relays are designated in turn by reference numerals 125, 126, 127, 128, 129 and 131. Consequently, supposing the leftmost control switch 85 has been closed to initiate operation of the machine, the subsequent closing of the switch 89 will result in closing of a circuit comprising the positive line 98, or lead L1, lead 122, switch 89, lead 123, switch 81 of the extra pair of switches 81, 82 of relay 73 bearing numeral II, the associated contact 82, lead 126, lead 102 through solenoid 75 of this relay 73, lead 103, master switch 35 and lead 104 to the negative side of line 99 or lead L2. Consequently, instant release of this control switch 85 will not effect de-energization of the relay 73 bearing numeral II, but the latter will remain energized until completion of a cycle of operation, at which time the above-described circuit will be broken by opening of the switch 89 by the other of the two bolts 97. Similar circuits will be activated by the closing of any of the control switches 85, and since the relays 73 energized thereby will remain so energized for the full cycle of operation, the motor 51 will also continue operating by virtue of the motor circuit contacts 81, 82 of such relay being held in closed position.

It will be understood that it is desirable that the spring contact 52 engaging the under surface of cylinder 37 be energized only during a regular cycle of operation of the machine in order to eliminate undesirable sparking between the contacts 58 and the cylinder 37 during insertion of a determining sheet 46 therebetween, when changing such sheets for scoring different tests. Such result is accomplished by connecting the contact 52 (as shown in Fig. 11) by means of a lead 132 to the lead 123 extending from switch 89, so that current may flow from line 98 or lead L1 to contact 52 only when switch 89 is closed. It also will be understood that each of the counters 22 incorporates well-known zeroizing mechanism so that the totals previously accumulated therein may be removed prior to the scoring of a new test. However, if it is desired to employ counters which do not include this feature, it will be necessary only to make an initial notation of the totals registered in each of the counters prior to the scoring of any test.

In Fig. 9 of the drawings, the control unit 84 is shown as disposed exteriorly of the casing 17 to facilitate operation thereof in scoring any desired psychological test. The cable 134 extending from the control unit includes the several leads 101, 105, etc. from the control switches 85 of the unit which are connected to the positive side of the line 98 or lead L1. The cable 135 includes leads 102, 106 and 112 to 115, extending from the switches 85 to the several relays 73. The arrangement illustrated diagramatically in Fig. 10 comprises three similar scoring devices hooked up together electrically for simultaneous operation in response to the control unit 84. In this arrangement, the several leads comprising the cable 134 will extend to the positive line 98, or lead L1 while those comprising the cable 135 will extend, respectively, to the eighteen different relays 73 included in the three scoring devices. It will be understood that such an arrangement enables scoring of psychological tests either for as many as forty-eight different variables simultaneously, or for any desired lesser number, any desired number thereof being selectable by proper operation of the different knife switches 34 of one or all of the switching assemblies 30 of the different machines. At the same time, such series or bank arrangement of several similar machines enables scoring of tests employing more than six optional answers for each question therein.

In Figs. 12, 13 and 14 a modified form of the instant psychological test scorer is disclosed in which the sensing contacts are normally maintained out of engagement with the cylinder 37, the relays 73 of the machine hereinbefore described are eliminated, the sensing contacts being connected electrically directly to the counter-actuating solenoids 25, and somewhat different control means are provided for operation in response to the control unit 84. In this modification, the sensing contacts are designated by reference numeral 158 and are independently pivotally mounted adjacent their rear ends on a shaft 133 extending transversely of the machine and journalled in any suitable manner in the casing thereof. The forward ends of these sensing contacts 158, which are disposed in substantially the same manner and number as the sensing contacts 58, are normally maintained out of contact with and in spaced relationship to the determining sheet 46 and cylinder 37 by a series of rectangular bails 136. Each bail 136 engages the lower edges of a group of eight adjacent contacts 158 and is connected at its upper end to the lower end of a coil spring 137 which in turn is connected at its upper end by a bracket 138 in any suitable manner to the casing of the machine. With this arrangement, each of the springs 137 and bails 136 will maintain a group of eight adjacent contacts 158 in their normally inoperative position of Fig. 12.

Means are provided for selectively rendering desired groups of the sensing contacts 158 operative by moving the associated bail 136 from such normal inoperative position downwardly against the action of its restraining spring 137, whereby gravity will maintain the forward ends of such selected contacts 158 in cooperative relationship with the determining sheet 46 and cylinder 37, under the control of an associated control switch 85. This means comprises a solenoid 175 mounted upon a suitable bracket 139 secured in any desired manner to the bottom wall of the machine casing and disposed below each of the bails 136. Each bail 136 is provided at its lower end below the associated contacts 158 with an armature 141 for cooperation with the coil of the associated solenoid 175. Consequently, energization of a solenoid 175 will result in the eight sensing contacts 158 associated therewith being drawn downwardly about the pivot rod 133 into contact at their forward ends with the cylinder 37.

A lever 142 is connected in any suitable manner intermediate its ends to each of the armatures 141 and is pivotally supported at 143 at its forward end upon a suitable bracket 144 mounted in any desired manner upon the bracket 139. At its rear end, each of the levers 142 is provided with a contact 181 in vertical alignment with and normally spaced from a similar stationary contact 182 mounted in any suitable manner, as by means of a bracket 145, on the bracket 139. Each spring 137 and bail 136 thus functions normally to maintain the contacts 181, 182 out of engagement with each other, and energization of the associated solenoid 175 will cause engagement of the contacts 181, 182.

A wiring diagram is illustrated in Fig. 14 for one of the above described solenoids 175 in this modified construction, it being understood that for a machine similar to that hereinbefore described, six such solenoids 175 will be employed, with the associated bail 136 of each of them engaging eight of the sensing contacts 158. Each solenoid 175 is electrically connected at one side to the positive line 98, or the lead $L_1$ if alternating current is employed, through one of the control switches 85 by a lead 146. The other side of each solenoid 175 is connected by a lead 147 to the negative line 99 or to a lead $L_2$ if alternating current is employed. The lower contact 182 associated with each solenoid 175 is connected by a lead 148 to the lead 146 thereof. The upper contacts 181 are electrically connected by a lead 149 to the spring contact 52 for engagement with the lower surface of the cylinder 37. The lead 149 is also connected by a lead 151 to a lead 152 extending from the cylinder cam-actuated switch 89 to one side of the motor 51. The other side of the motor is connected by a lead 153 to the line 99, $L_2$. Each of the sensing contacts 158 is directly connected by a lead 154 to the switching assembly 30 so as to be selectively connected in the manner hereinbefore described to one of the register-actuating solenoids 25.

Operation of this modified construction is substantially identical to that of the machine hereinbefore described. Closing of any one of the control switches 85 will result in energization of the associated solenoid 175 through the leads 146, 147 and such energization of a solenoid 175 will result in the eight associated sensing contacts 158 being swung into contact with the determining sheet 46 and cylinder 37 and also in closing of the associated contacts 181, 182. The latter will complete a circuit from the line 98, $L_1$ through the actuated switch 85, leads 146 and 148, contacts 181, 182 and leads 149, 151, and 152 to the motor 51. Rotation of the cylinder 37 in response to actuation of the motor 51 will close the cam switch 89 in the manner hereinbefore described, resulting in a circuit being completed from the line 98, $L_1$ through the switch 89 and energized solenoid 175 by way of leads 152, 151, 149, 148 and 147 to the line 99, $L_2$ to maintain energization of this solenoid 175 despite release of its actuated switch 85 by the operator. Completion of each cycle of operation of the machine effected by operation of a control switch 85 is thus assured in the same manner as was previously explained herein. During each such cycle of operation, a register actuating circuit will be completed through each of the eight sensing contacts 158 thus activated each time an aperture 72 in the determining sheet 46 appears in alignment with and below the forward, depending end thereof to accumulate the proper part scores in the manner hereinbefore described in detail.

It is thought that the invention and many of its attendant advantages will be understood from the foregoing description, and it will be apparent that various changes may be made in the form, construction and arrangement of the parts without departing from the spirit or scope of the invention or sacrificing all of its material advantages, the form hereinbefore described being merely a preferred embodiment thereof.

We claim:

1. A psychological test scoring device for simultaneously deriving scores for a number of variables from any possible set of answers to a plurality of questions forming the test, comprising a plurality of operation-initiating control members selectively manually depressible in accordance with each said answer and successively operable a number of times corresponding to said plurality of questions, determining means cyclically operable in response to depression of said control members for automatically selecting proper part scores for each variable for each possible answer, means for simultaneously accumulating such part scores separately for each variable, and means operable in response to said determining means for actuating said accumulating means to derive the proper score for each variable.

2. A psychological test scoring device for simultaneously deriving scores for a number of aptitudes from any set of answers to a plurality of questions making up the test, comprising a plurality of operation-initiating control members equal in number to the number of possible answers to each said question and selectively manually depressible in accordance with each said answer and successively operable a number of times corresponding to said plurality of questions, determining means for predetermining variable part scores for each aptitude for each possible answer to each question and selectively rendered partially effective automatically by each successive operation of said control members, means for simultaneously accumulating such part scores separately for each aptitude, and means operable in response to that part of said determining means rendered effective by said control members for actuating said accumulating means.

3. A psychological test scoring device for simultaneously deriving scores for any desired number of variables from any possible set of answers to a plurality of questions forming the test, comprising a set of control members selectively manually depressible in accordance with each said answer and successively operable a number of times corresponding to said plurality of questions, determining means automatically operable in response to each operation of said control members for selecting proper part scores for each of a plurality of variables for each possible answer for all of the questions of said test, means for simultaneously accumulating such part scores separately for each such variable, means operable in response to said determining means for actuating said accumulating means to derive the proper score for each such variable, and means for inter-connecting a plurality of such determining, actuating and accumulating means under the control of said set of control members to simultaneously derive scores for any desired number of variables in addition to those derived responsive to said first-recited determining means.

4. A psychological test scoring device for simultaneously deriving scores for a number of variables from any possible set of answers to a plurality of questions forming the test, comprising a plurality of control members selectively operable manually in accordance with each said answer and successively operable a number of times corresponding to said plurality of questions, normally ineffective determining means cyclically operable in response to each successive operation of said control members and having a plurality of sections each of which is rendered effective selectively by operation of a particular one of said control members and functions to select proper part scores for each variable, a plurality of registers each adapted to accumulate such part scores for one of said variables, and means operable in response to the operation of said determining means for actuating said registers.

5. A device for the class described, comprising a plurality of registers, means for actuating said registers individually, determining means having a plurality of sections each of which is selectively operable to control the entry of different predetermined amounts in said registers by said actuating means, a plurality of control means each of which is selectively operable to render effective one of said sections of said determining means, and a plurality of manually depressible control members each of which is selectively operable to effect operation of one of said control means.

6. A psychological test scoring device for simultaneously deriving scores for a number of variables from any possible set of answers to a plurality of questions forming the test, comprising a plurality of control members each selectively operable manually in accordance with each possible answer to a question and successively operable a number of times corresponding to said plurality of questions, a plurality of control means operable respectively in response to one of said control members, determining means cyclically operable in response to each said control means for selecting proper part scores for each variable for each possible answer, means operable by said determining means for insuring a full cycle of operation thereof and continuous operation throughout said cycle of the said control means operated in response to a said selectively operated control member, means for simultaneously accumulating such part scores separately for each variable, and means operable in response to said determining means for actuating said accumulating means to derive the proper score for each variable.

7. A psychological test scoring device for simultaneously deriving scores for a number of variables from any possible set of answers to a plurality of questions forming the test, comprising a plurality of manual control members selectively operable in accordance with each said answer and successively operable a number of times corresponding to said plurality of questions, determining means operable in response to said control members and having a section corresponding to each said member for selecting proper part scores for each variable, counters for accumulating such part scores separately for each variable, electrical means controlled by said determining means for actuating each said counter a number of times corresponding to the part score selected by that section of said determining means operated in response to a selectively operated control member, a source of electrical energy, and normally open electrical switches interposed between each said counter actuating means and said source of energy selectively closed in response to operation of said control members.

8. A device of the class described, comprising a plurality of registers, electrical means for imparting successive unitary actuations to each said register, a source of electrical energy for energizing said register actuating means, contact means interposed between said source of energy and each said register actuating means, determining means movable through successive cycles of operation and having a plurality of sections normally maintaining said contact means open, each said section being adapted during each cycle of operation to control successive closing and opening of some of said contact means for different numbers of times to effect entry of different amounts in said registers by said actuating means, a plurality of normally open switches interposed respectively between each said contact means and said register actuating means, a plurality of relays each selectively operable to close the said switches connected with those of said contact means controlled by a different one of said sections of said determining means, a plurality of manual control members selectively operable each to effect operation of one of said relays, means operable in response to any one of said control members for actuating said determining means, and means operable by said last means for insuring a full cycle of operation of said determining means upon operation of any said control member and for maintaining closed throughout said cycle those of said switches caused to be closed by said operated control member.

LEROY N. VERNON.
CHARLES A. OLSON.

REFERENCES CITED

The following references are of record in the file of this patent:

UNITED STATES PATENTS

| Number | Name | Date |
| --- | --- | --- |
| 430,804 | Hollerith | June 24, 1890 |
| 1,916,997 | Tauschek | July 4, 1933 |
| 2,106,801 | Houston | Feb. 1, 1938 |
| 2,110,858 | Galyon | Mar. 15, 1938 |